(12) United States Patent
Polar

(10) Patent No.: US 7,315,266 B1
(45) Date of Patent: Jan. 1, 2008

(54) REVERSIBLE COMPRESSION OF LOW-ORDER BITS IN DIGITAL IMAGES

(76) Inventor: Andrew Polar, 703 Howell Ct., Duluth, GA (US) 30096

( * ) Notice: Subject to any disclaimer, the term of this patent is extended or adjusted under 35 U.S.C. 154(b) by 0 days.

(21) Appl. No.: 11/514,113

(22) Filed: Sep. 1, 2006

(51) Int. Cl.
  *H03M 7/00* (2006.01)
(52) U.S. Cl. ......................................... 341/106; 341/50
(58) Field of Classification Search ........ 341/100–110, 341/50, 106
  See application file for complete search history.

(56) References Cited

U.S. PATENT DOCUMENTS 6,023,511 A * 2/2000 Chen et al. .................... 380/54
6,725,361 B1 * 4/2004 Rozas et al. ................. 712/222

OTHER PUBLICATIONS http://www.ezcodesample.com/$pre_{13}$image_reduction.html published Jul. 22, 2007 by Andrew Polar.
S.A. Martucci "Reversible compression of HDTV images using median adaptive prediction and arithmetic coding" In Proceedings of IEEE ISCAS, May 1990, pp. 1310-1313.
Web site www.r0k.us/graphics/kodak Aug. 22, 2006.
Web site www.cipr.rpi.edu/~said/FastAC.html Aug. 22, 2006.
Web site www.Bitjazz.com/photojazz/about/testset.shtml Aug. 22, 2006.
Web site www.Bitjazz.com/photojazz/about/statistics.shtml Aug. 22, 2006.

* cited by examiner

*Primary Examiner*—Lam T. Mai

(57) ABSTRACT

Method of reversible compression of low-order bits in digital images that uses image palette as a look up table for high versus low order bit fragments and replaces actual low-order bit fragments in the image by relative sequential indexes that identify the position of correspondent low-order bit fragment in palette array. Said relative sequential indexes are smaller than low-order bit fragments because they are introduced and incremented within the same high-order bit expression in palette array and have significantly different statistical distribution properties compared to distribution of original low-order bit fragments. For successful reconstruction of said low-order bit fragments from said relative sequential indexes the critical part of palette array is saved in compressed data. In spite of additional data buffer the method significantly improves compression ratio and has dual effect: first is compression of low-order bits and second is possibility to ignore then low-order bits in data modeling.

1 Claim, No Drawings

REVERSIBLE COMPRESSION OF LOW-ORDER BITS IN DIGITAL IMAGES

CROSS-REFERENCES TO RELATED APPLICATIONS

Not Applicable

FEDERALLY SPONSORED RESEARCH OR DEVELOPMENT

Not Applicable

SEQUENCE LISTING OR A COMPUTER PROGRAM

Not Applicable

BACKGROUND OF INVENTION

1. Field of Invention

This invention relates to reversible image compression, specifically it suggests the technique for reversible compression of the most problematic part of image: low-order bits.

2. Prior Art

As it is widely used in many reversible formats such as PNG (Portable Network Graphics), TIFF (Tagged Image File Format), JPEG-LS (lossless JPEG) and others, image compression has two sequential operations: data modeling and entropy coding. Data modeling is designed to reduce integers, representing pixel data. Entropy coding is used to replace these integers by shorter binary sequence. Data modeling exploits correlation between rows, columns and colors. For color photographic pictures this correlation is known to be strong in high-order bits and practically not existing in low-order bits, which are treated as an obstruction in compression process. In irreversible compression such as JPEG (Joint Photographic Experts Group) the data modeling is designed to reproduce high-order bits while difference in low-order bits is ignored. This leads to significantly higher compression ratio. Though low-order bits can't be distinguished by the sight of majority of people some business activity require reversible compression of photographic images independently of human perception of quality. The suggested method addresses the problem of compression of low-order bits independently, leaving them out of the scope of compression of remained bits that leads to higher compression.

OBJECTS AND ADVANTAGES

The primary goal of invention is raising the ratio for reversible compression of digital images. The suggested method is designed specifically for low-order bits. Independent compression of low-order bits allows improve data modeling for other part of the image. This is considered as important advantage of suggested method, because it can be applied as supplemental means to already known algorithms.

BRIEF SUMMARY OF INVENTION

Though low-order bits are not correlated in rows, columns and colors (or sometimes called channels), they are correlated with high-order bits. This correlation can be detected by analyzing the image palette. If we presume conventional border between low and high order bits we may find that big number of high-order bit expressions contains the only low-order bit counter part and some of them contain several different low-order parts, but their number is significantly below theoretical possibility. The suggested method uses an image palette as a look up table. The low-order bit expressions in pixel data are replaced by a relative sequential index introduced for palette array. In reverse process this said relative sequential index is used for locating of correct low-order bit expression in palette. The critical part of palette array must be saved. In spite of additional data to save, the suggested method improves compression ratio for a certain type of high quality photographic images.

BRIEF DESCRIPTION OF SEVERAL VIEWS OF THE DRAWING

Not Applicable

DETAILED DESCRIPTION OF THE INVENTION

Preferred Embodiment

Since method uses reordering bits within the values, it is much easier to understand it following concrete example. The example shows all required operations on five particular palette elements for 24 bit color image, processed by little-endian processor. The type of processor and color depths are chosen for this example. The method works for big-endian processor and for a different color depth. Let us presume five concrete pixels from image palette and show them in the table below in binary form.

| Red color bits | Green color bits | Blue color bits |
| --- | --- | --- |
| 1001 1100 | 0110 1111 | 1010 0010 |
| 1001 1100 | 0110 1111 | 1010 0011 |
| 1001 1101 | 0110 1111 | 1010 0010 |
| 1001 1110 | 1100 0011 | 0000 0101 |
| 1001 1111 | 1100 0011 | 0000 0101 |

We introduce array of 24 bit integers for palette and rearrange bits within elements. We draw the conventional border between low and high order bits. The least significant bit of every color is passed to low-order bit group and moved to the "tail". The other bits are moved to upper contiguous area. The result is shown in the next table below.

| High-order bits | Low-order bits |
| --- | --- |
| 100111001101111010001 | 010 |
| 100111001101111010001 | 011 |
| 100111001101111010001 | 110 |
| 100111111000010000010 | 011 |
| 100111111000010000010 | 111 |

In sorted palette array the high-order bit expressions are repeated for some sequential elements. We omit those repeated fragments in our explanation. The result is shown in the next table.

| High-order bits | Low-order bits |
| --- | --- |
| 100111001101111010001 | 010 |
| ... | 011 |
| ... | 110 |
| 100111111000010000010 | 011 |
| ... | 111 |

The palette now represents tree type structure, where every high-order expression is a node identification number and low-order bit expressions are items. Technically, the palette at this stage is still array of integers. The tree type structure is our interpretation only. At this stage we introduce a relative sequential index for low-order bit expressions within same high-order bit expression. The result is shown in the next table.

| High-order bits | Low-order bits | Relative sequential index |
| --- | --- | --- |
| 100111001101111010001 | 010 | 0 |
| ... | 011 | 1 |
| ... | 110 | 2 |
| 100111111000010000010 | 011 | 0 |
| ... | 111 | 1 |

In compression process we read image pixel by pixel and find correspondent palette element in palette array that must be unique. When element is identified the correspondent relative sequential index is saved to output buffer as a replacement of low-order bits. Then low-order bits are shifted out and reversible compression can be applied for remained part. In reversible process the high-order bits are restored at the first stage. Then given the palette, high-order bit expression, and relative sequential index, the low-order bit expression is identified and attached to known high-order bits. For successful reverse process the palette must be known and presented in exact same order as it was used in compression. Since high-order bits are reversibly compressed independently from low-order bits, they don't have to be saved. The palette can be reproduced for known low and high parts. The high-order parts are completely restored in reverse process for high-order bits. After they are restored and sorted, they represent array of all different integers shown in the first column of previous table. We need only to save low-order bits in the same order that they are shown in last table and additional mapping indicator as it is shown in the next table

| High-order bits | Low-order bits | Mapping indicator |
| --- | --- | --- |
| 100111001101111010001 | 010 | 0 |
| ... | 011 | 1 |
| ... | 110 | 1 |
| 100111111000010000010 | 011 | 0 |
| ... | 111 | 1 |

High order-bit expressions are merged with those low-order bits that have mapping indicator equal to zero and repeated down for other elements that have mapping indicator equal to 1. In the considered example 4 bits per palette element has to be saved to additional data buffer.

There is one time consuming operation in both compression and decompression process. Program needs to identify the position of the first element of palette array with given 21 bits. This operation is performed for every pixel in image during compression and decompression. To avoid long processing we introduce an array of global offset indexes. Presume that palette element 100111001101111010001010, which is expression from the first row, is located at the position 28234. The first 21 bits, which is 100111001101111010001, equal to 1285073 (on little-endian processor). These two integers 1285073 and 28234 are associated in array of global offset indexes. The element number 1285073 of array of global offset indexes has value 28234. The second high-order bit expression from the last table is accordingly 1306754 and makes element 1306754 with value 28237. The operation of building array of global offset indexes is quick and conducted once per compression or decompression. During processing of particular pixel, the position of required palette element is found from global offset array by direct addressing. The memory required for this array is significantly below the default size allowed per process in widely used operating systems.

Selection of Low-Order Bit Group

The group of low-order bits is not necessarily combination of least significant bit of every color. Some images have the best compression ratio when last 3 bits of every color are combined in low-order bit group (9 bits total). The selection of threshold between low and high order bit is out of the scope of suggested method. Method is applied when such decision is made.

Experimental Results

Since the suggested method compresses only low-order bits it was tested along with base method that compresses the other part. In the experiment two results are compared: base method only and base method along with suggested method. The base method was chosen as combination of median adaptive predictor with consequent arithmetic encoding similar to provided in the article of S. A. Martucci "Reversible compression of HDTV images using median adaptive prediction and arithmetic coding" In Proceedings of IEEE ISCAS, May 1990, pp. 1310-1313. The arithmetic encoder named "FastAC", was taken from public source at World Wide Web. The images were also selected from World Wide Web. They were Kodak images named as "Kodim01", "Kodim02" and so on, available in many domains and used by many companies for establishing their benchmarks. The test results are presented in the table below. Second and third columns contain statistical data that explains fact of compression of low-order bits. Third column shows the palette size, second column shows the palette size calculated for high-order bit group only. In our case it is first 7 bits of every color i.e. upper 21 bits. If 21 bit palette has 17654 different elements and whole 24 bit palette has 19182 elements than array of relative sequential indexes has size of 19182 and contains 17654 zeros and 1528 other numbers, most of which are equal to 1. That explains good compression of array of relative sequential indexes. All images are 768*512 in size, so the palette sizes for them are between $\frac{1}{6}^{th}$ and $\frac{1}{30}^{th}$ of the image size. That explains small size of additional data buffer. The fourth column shows the compression ratio for low-order bits including all necessary information required for their exact reconstruction when high order part is known. Last two columns show comparison of image compression ratio when only base method is used and when combination of the base method with suggested method is used. The average improvement is about 18%. Though on absolute scale the result is better than some known formats, the purpose of experiment was not to establish the record, because companies are conducting on-going research and the records can be changed at any time. The purpose of experiment was to demonstrate possibility of improvement base method by supplementing it with suggested technique. This opens the opportunity to use suggested method in the extended future along with some other compression methods that are being developed. The whole and partial palette sizes are to be used to make decision regarding efficiency of low-order bit compression, because such favorable ratio as in second and third columns is not automatically guaranteed for all images.

| Image | 21 bit palette | 24 bit palette | Low bit cmpr. | Base only | Base & suggested |
|---|---|---|---|---|---|
| Kodim01 | 17654 | 19182 | 4.93 | 2.26 | 2.69 |
| Kodim02 | 12351 | 13452 | 4.81 | 2.38 | 2.91 |
| Kodim03 | 31342 | 34871 | 3.68 | 2.80 | 3.29 |
| Kodim04 | 29219 | 31716 | 4.23 | 2.33 | 2.78 |
| Kodim05 | 58620 | 63558 | 2.89 | 2.03 | 2.35 |
| Kodim06 | 23933 | 25964 | 3.81 | 2.32 | 2.75 |
| Kodim07 | 34741 | 37552 | 4.15 | 2.68 | 3.17 |
| Kodim08 | 41067 | 45558 | 2.88 | 2.08 | 2.38 |
| Kodim09 | 22715 | 24106 | 5.18 | 2.58 | 3.14 |
| Kodim10 | 20003 | 21537 | 4.55 | 2.54 | 3.07 |
| Kodim11 | 31680 | 34473 | 4.08 | 2.37 | 2.85 |
| Kodim12 | 23420 | 25567 | 3.81 | 2.71 | 3.16 |
| Kodim13 | 35989 | 39784 | 3.32 | 1.91 | 2.22 |
| Kodim14 | 51187 | 55117 | 3.31 | 2.14 | 2.52 |
| Kodim15 | 41128 | 44576 | 2.76 | 2.42 | 2.74 |
| Kodim16 | 13002 | 14096 | 5.55 | 2.63 | 3.17 |
| Kodim17 | 18221 | 19815 | 4.70 | 2.48 | 3.03 |
| Kodim18 | 52442 | 57415 | 3.25 | 2.01 | 2.36 |
| Kodim19 | 22569 | 24807 | 4.16 | 2.30 | 2.77 |
| Kodim20 | 22173 | 24470 | 2.35 | 2.97 | 3.26 |
| Kodim21 | 26707 | 29317 | 3.83 | 2.28 | 2.72 |
| Kodim22 | 47722 | 53351 | 3.18 | 2.17 | 2.55 |
| Kodim23 | 65891 | 72079 | 2.73 | 2.60 | 2.97 |
| Kodim24 | 38545 | 42351 | 3.21 | 2.22 | 2.56 |

I claim:

1. A method of reversible compression of low-order bits in digital images, comprising the steps of:

(a) providing a memory which can store intermediate data and final result, (b) providing a means of performing arithmetical and logical operations on an image data, (c) collecting a palette as a sequence of same size binary expressions representing every different pixel data occurred in said image, (d) rearranging bits in every element of said palette by passing low order bits of every color to a contiguous binary fragment locating at a position of lower order bits for a particular type processor, wherein the operations are conducted, and having thereof every said palette element containing two conventional contiguous groups of bits a high order group and low a order group, (e) sorting said palette in either ascending or descending order, (f) introducing an array of relative sequential indexes representing a small integer associated with every palette element and started from zero for every said new high order bit group and incremented by one for the next palette element within the same said high order bit group, (g) introducing mapping indicator representing one bit associated with every said palette element that is used to mark every new value of said high order bit group, (h) providing an entropy encoder compress part of palette representing column of low order bit groups along with attached mapping indicator and output result into said memory, (i) introducing two dimensional array of same size as said digital image filled with said relative sequential indexes wherein each index is taken as the one associated with correspondent palette element occurred in correspondent row and column of said digital image, (j) providing the entropy encoder compress said two dimensional array of relative sequential indexes and output result into said memory, (k) removing compressed low order bits from said digital image or making them ignored in further independent compression of high order bits.

* * * * *